April 16, 1957    W. C. HUEBNER    2,788,705
MICROFILM STEP AND REPEAT CAMERA
Filed July 24, 1953    8 Sheets-Sheet 1

INVENTOR.
WILLIAM C. HUEBNER
BY
Hudson, Boughton, Williams
David & Hoffmann
ATTORNEYS April 16, 1957  W. C. HUEBNER  2,788,705
MICROFILM STEP AND REPEAT CAMERA
Filed July 24, 1953  8 Sheets-Sheet 4

INVENTOR.
WILLIAM C. HUEBNER
BY
Hudson, Boughton, Williams,
David & Hoffmann
ATTORNEYS

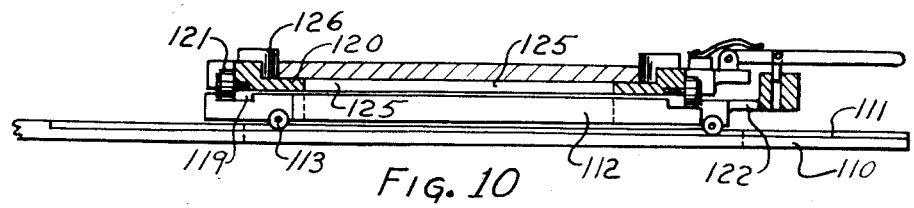
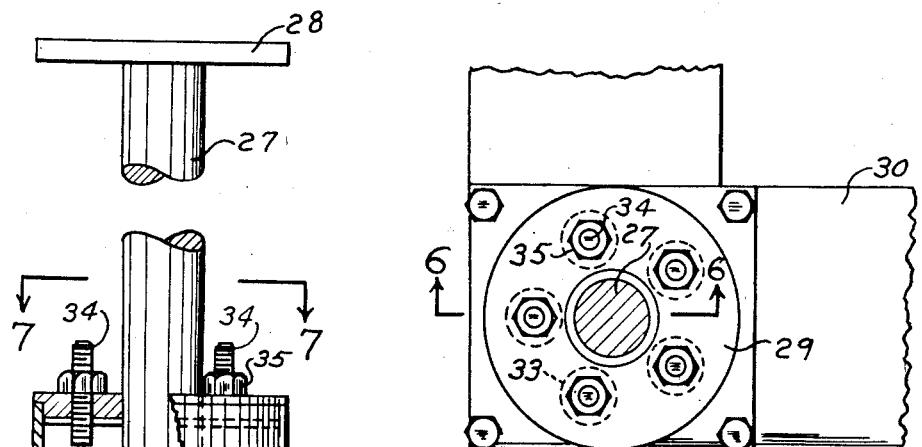
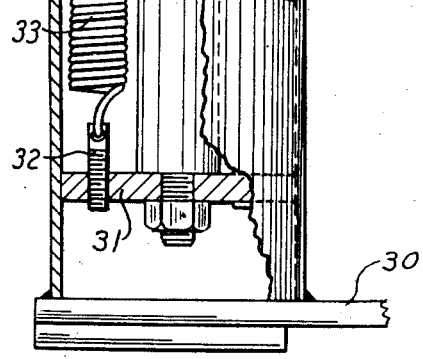
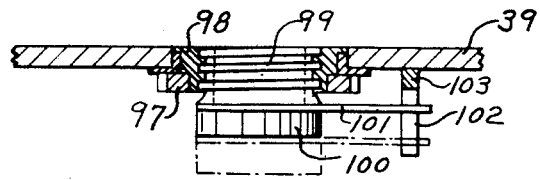

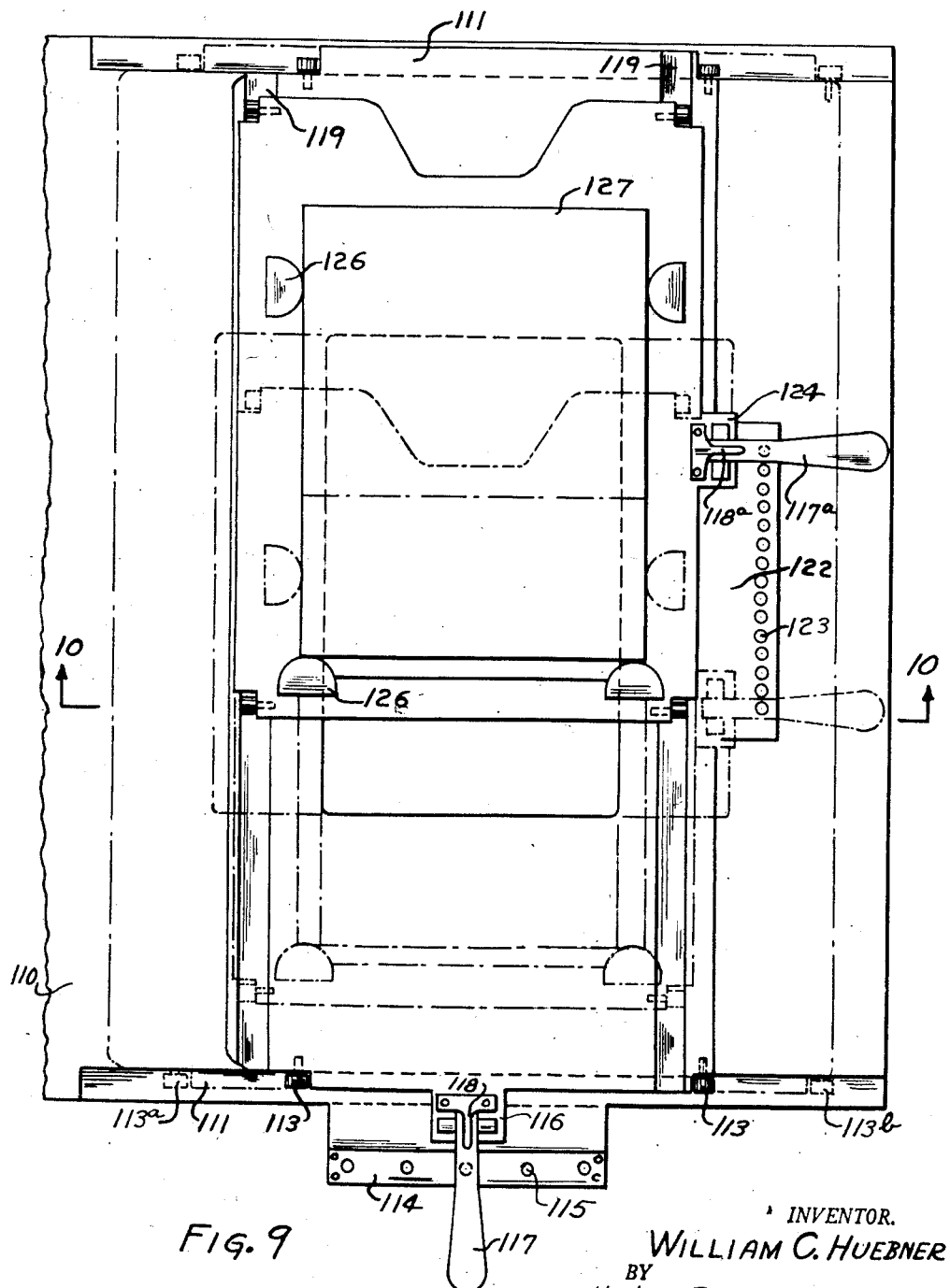

April 16, 1957 W. C. HUEBNER 2,788,705
MICROFILM STEP AND REPEAT CAMERA
Filed July 24, 1953 8 Sheets-Sheet 7

INVENTOR.
WILLIAM C. HUEBNER
BY
Hudson, Boughton, Williams
David & Hoffmann
ATTORNEYS

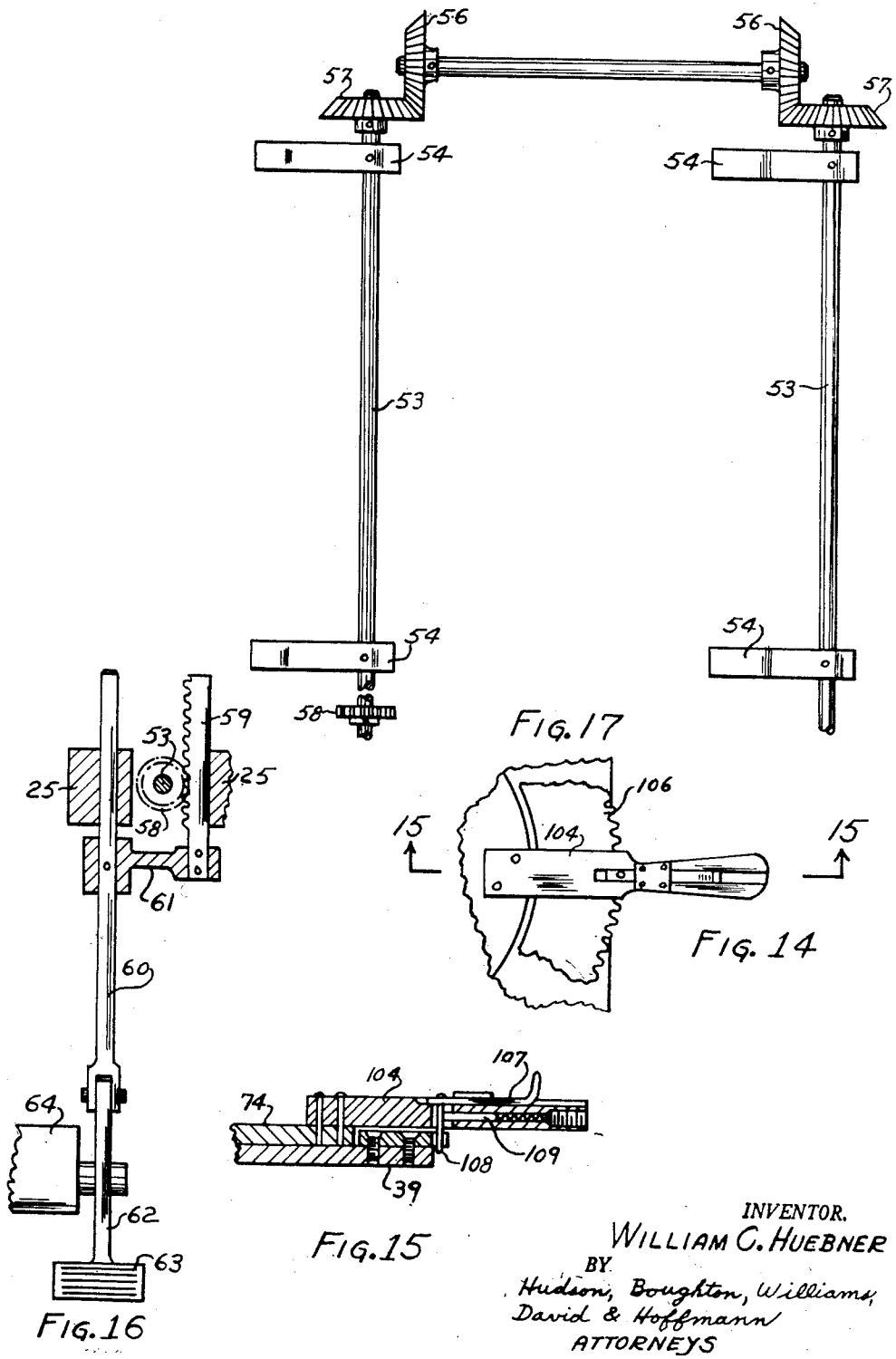

United States Patent Office 2,788,705
Patented Apr. 16, 1957

2,788,705

MICROFILM STEP AND REPEAT CAMERA

William C. Huebner, New Rochelle, N. Y., assignor to The Huebner Company, Dayton, Ohio, a corporation of Ohio Application July 24, 1953, Serial No. 370,198

2 Claims. (Cl. 88—24)

This invention relates to a method of and apparatus for producing microfilm photographs from copy and for reproducing from the developed microfilm photographs positive reproductions thereof which may be on an enlarged scale. The method and apparatus may be suitably designated as a microfilm step and repeat photographic method and camera.

The principal object of the invention is to provide a method of and apparatus for producing from multiple copy a multiplicity of microphotographs corresponding in number to the copy and arranged on a flat or planular sheet film or plate surface in multiple series and in multiple rows of series as distinguished from a multiplicity of microphotographs arranged in a single series on a continuous roll film.

A further object is to provide an apparatus as referred to in the last named object and which apparatus can be employed to reproduce from the developed flat or planular sheet film or plate containing the multiplicity of microphotographs and on a flat or planular sensitized surface selected positive reproductions of certain predetermined developed microphotographs contained on the film or plate.

Another object is to provide a method and apparatus such as referred to in the first named object and wherein individual book pages can be successively microphotographed on the flat or planular sheet film or plate with the individual pages arranged in multiple series and in multiple rows on the film or plate.

Another object is to provide a method and apparatus, as referred to in the first object, for producing on a flat or planular sheet film or plate microphotographs of a multiplicity of separate copies arranged in multiple series and in multiple rows (as for example a multiplicity of record cards) with the microphotographs on the film or plate similarly arranged in corresponding multiple series and multiple rows of series.

A still further object is to provide an apparatus such as defined in the last named object and wherein both the separate multiple copies and the flat or planular sheet film or plate can be shifted to center each copy in the focal axis of the lens of the apparatus and in position to be photographed on the film or plate in the area thereof that is correlated to the area occupied by each separate copy.

A still further object is to provide an apparatus as defined in the preceding objects and wherein the flat or planular sheet film or plate upon which the microphotographs are made is mounted in a compound slide arrangement effective to shift the film or plate in either of two directions perpendicular to each other to locate different portions of the film or plate area in the focal axis of the lens of the apparatus.

Another object is to provide in an apparatus as referred to in the preceding object and in addition to the compound slide for shifting the flat or planular sheet film or plate in either of two perpendicular directions, a compound slide on which the multiple copies are mounted so that the film and the multiple copies can be selectively shifted in correlation to each other to bring various of the copies and various area portions of the film or plate into the focal axis of the lens of the apparatus to produce the multiple series and multiple rows of microphotographs of the multiple copies.

A further object is to provide an apparatus as defined in the last named object and wherein the developed film or plate containing the microphotographs can be positioned in one compound slide and a sensitized plate or flat film positioned in the other compound slide and positive reproductions of the microphotographs can be reproduced on the sensitized plate or film by shifting the developed film or plate and the sensitized plate or flat film in correlation and in either of two directions perpendicular to each other to form multiple series and multiple rows of positive reproductions of the microphotographs.

A still further object is to provide an apparatus for producing on a flat or planular sheet film or plate a multiplicity of microphotographs from multiple copy arranged in multiple row series, such that the multiple microphotographs can be individually readily identified and located for viewing purposes or for reproduction purposes in that each of the multiple microphotographs can be properly numbered or otherwise identified so as to be correlated to different adjusted positions of a compound slide.

A still further object is to provide an apparatus of the type referred to in the preceding objects and wherein the flat or planular sheet film or plate is mounted in a carriage that moves linearly toward and away from the copy with provision being included for causing the movement of the carriage to automatically adjust the lens of the apparatus to produce a focused image of the copy on the surface of the film or plate in any position of the carriage relative to the copy, thereby assuring at all times the attainment of a sharper focused image and a correct microphotograph of the copy.

A still further object is to provide an apparatus of the type hereinbefore referred to and which apparatus is so mounted and supported as to be substantially vibration-free.

Further and additional objects and advantages residing in the invention and not hereinbefore specifically referred to will become apparent during the detailed description which is to follow of an apparatus embodying the invention and which may be used to perform the method and which apparatus is illustrated in the accompanying drawings forming a part of this specification and wherein, Fig. 1 is a front elevational view of an apparatus embodying the invention with certain parts of the apparatus shown in one operative position in full lines and in other operative positions by dot and dash lines.

Fig. 6 is a detached detailed view of one of the supports for the apparatus on an enlarged scale and is partially in elevation and partially in section, the section being taken along line 6—6 of Fig. 7 looking in the direction of the arrows.

Fig. 7 is a sectional view taken substantially on line 7—7 of Fig. 6 looking in the direction of the arrows.

Fig. 8 is a sectional view taken along line 8—8 of Fig. 3 looking in the direction of the arrows.

Fig. 9 is a top plan view of the compound slide mounted on the film carriage.

Fig. 10 is a sectional view taken substantially on line 10—10 of Fig. 9 looking in the direction of the arrows.

Fig. 14 is a fragmentary elevational view.

Fig. 15 is a sectional view taken along line 15—15 of Fig. 14 looking in the direction of the arrows.

Fig. 16 is a schematic showing of a portion of the actuating mechanism for the copy raising and lowering cams.

Fig. 17 is a schematic showing of another portion of the actuating mechanism for the copy raising and lowering cams.

Figure 1:
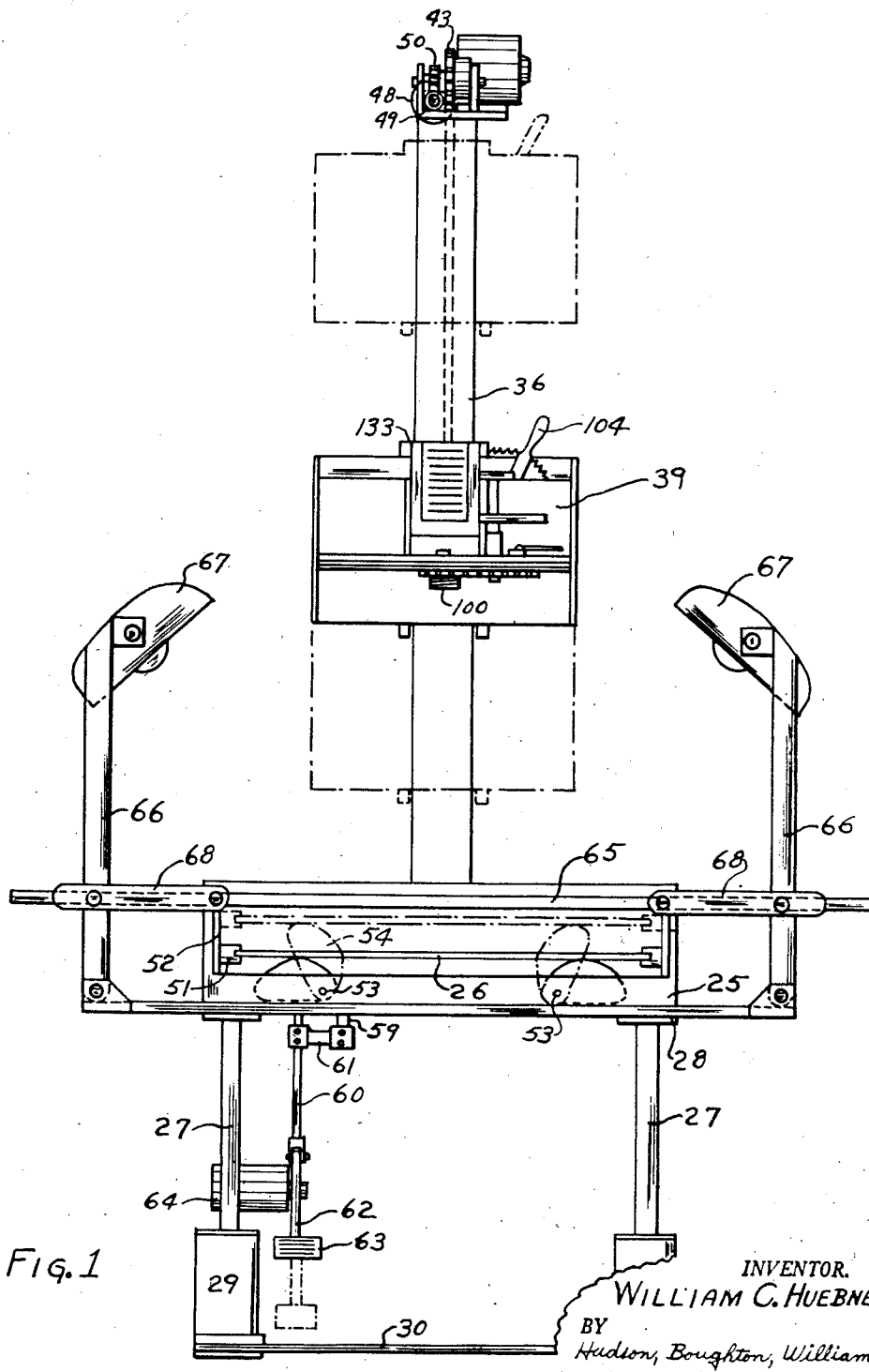

The apparatus embodying the invention and illustrated and described herein and constituting one form of apparatus by which the method may be performed comprises a copy holder indicated generally at 25 and which is substantially rectangular and movably mounts within it a copy support indicated at 26 and later to be referred to. The copy holder 25 is supported at its four corners by an arrangement now to be described.

The four legs or posts 27 are provided at their upper ends with attaching plates or flanges 28 that are secured to the underside of the copy holder 25 at the four corners thereof (see Figs. 1, 2, 6 and 7). The posts or legs 27 each extends into a cylindrical casing 29 that is secured at its lower end to a bed plate 30. Each post or leg 27 has secured to its lower end within the casing 29 a plate 31 which slidably fits the casing and guides the vertical movement of the post or leg relative to the casing, it being noted that the post or leg is also guided by the upper end of the cylindrical casing 29.

The plate 31 adjustably mounts a plurality of vertically extending circumferentially spaced threaded studs 32 provided at their upper ends with an eye, there being five such studs in the construction illustrated herein. Each stud 32 is connected by means of its eye with the lower end of a coiled extension spring 33, it being understood there are five such springs.

The upper end of each spring 33 is conected to the eye of a vertically extending threaded stud 34 which is mounted in the upper end of the cylindrical casing 29 and extends outwardly thereof. Each of the studs 34 exteriorly of the cylindrical casing mounts a lock nut 35, wherefore each stud can be adjusted and locked in adjusted position. The spring suspension of the posts or legs 27 just described provides a support for the copy holder 25 and the remainder of the apparatus hereinafter described, such that vibrations will be absorbed by the multiplicity of extension springs 33. Also it will be noted that the individual sets of extension springs 33 can be adjusted to compensate for the weight distribution in the apparatus.

The copy holder 25 rigidly mounts at its rear end and midway of its sides a vertically extending supporting column 36 which is illustrated as tubular in cross section (see Figs. 1, 2, 3, 4 and 5). The column 36 has rigidly secured to it at the front of the column a vertically extending T-shaped guideway consisting of the leg portion 37 and the head or cross portion 38 which is spaced from the column but extends vertically parallel thereto and perpendicular to the copy holder 25.

An I-shaped carriage supporting the lens mechanism and the automatic focusing control mechanism later to be described is indicated at 39 and said carriage extends outwardly horizontally from the column 36 toward the front of the apparatus and is substantially parallel to the copy holder 25.

Figure 2:
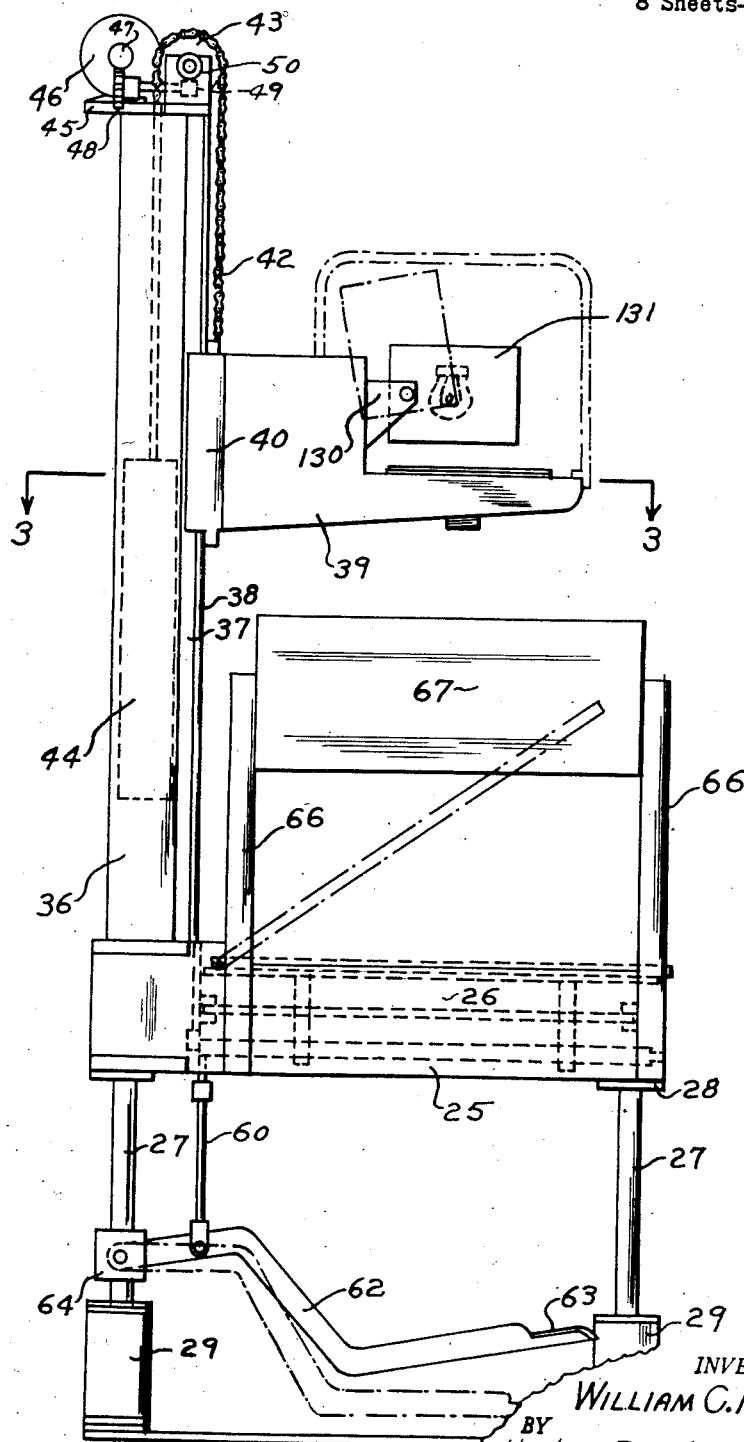
Fig. 2 is a side elevational view of the apparatus shown in Fig. 1 and is taken looking from the left hand side of Fig. 1.
Figure 3:
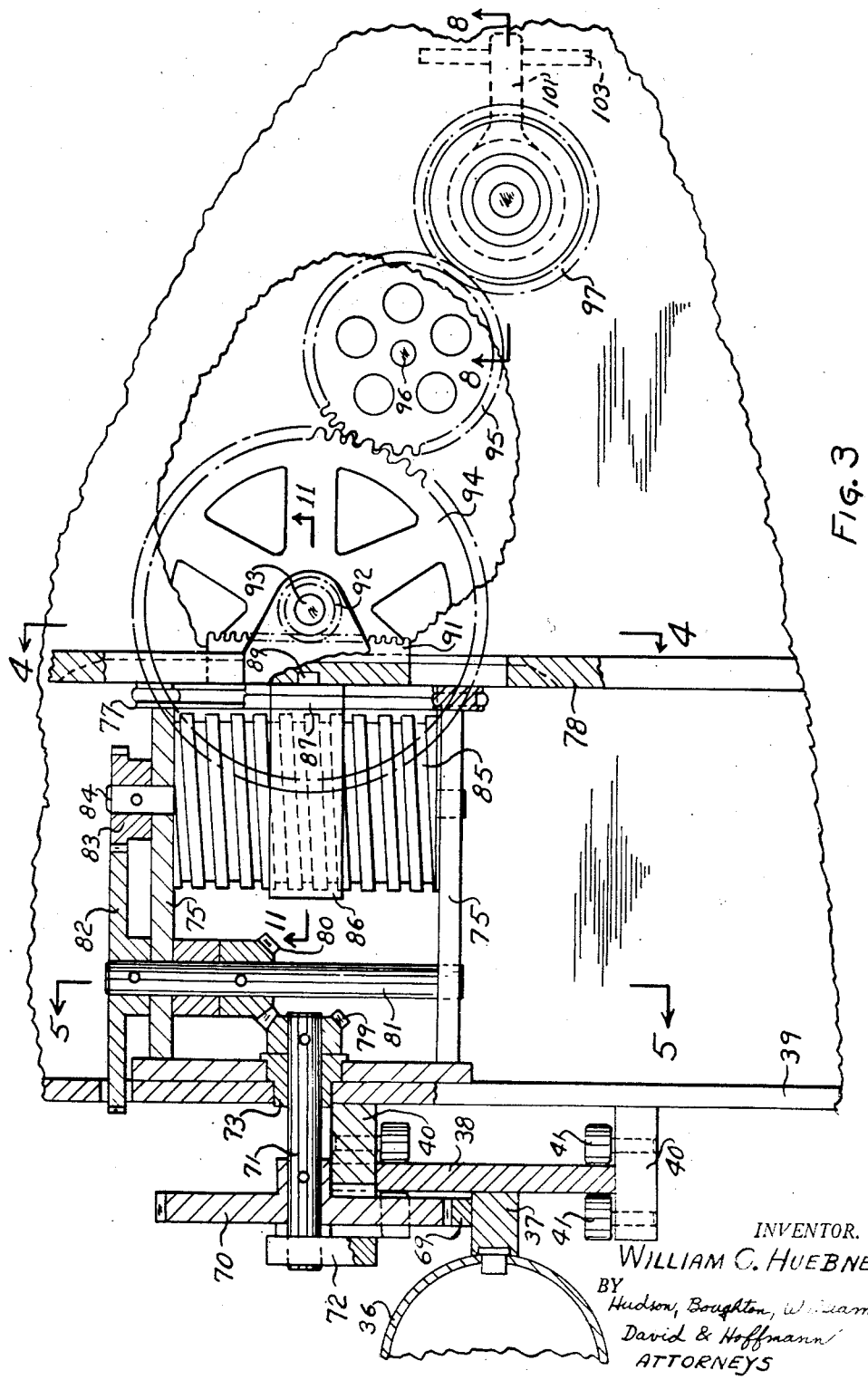
Fig. 3 is a horizontal sectional view taken along line 3—3 of Fig. 2 looking in the direction of the arrows and on a larger scale than Fig. 2.

The rear of the carriage 39 is provided with vertically extending spaced parallel supporting strips 40 which are located at the opposite edges of the head or cross portion 38 of the T-shaped guideway, see Figs. 2 and 3. Each strip 40 mounts two vertically spaced pairs of rollers 41 with one of the rollers of each pair contacting the rear side of the head 38 and the other roller of each pair contacting the front side of said head. It will thus be seen that the carriage 39 is supported anti-frictionally on the head 38 for vertical movement therealong.

The carriage 39 at its rear upper end is connected to a chain or cable 42 which extends over a sheave 43 at the upper end of the column 36 and then downwardly inside of said column where it is connected to a counterweight 44 of a mass sufficient to counterbalance the carriage 39 and the mechanism carried thereby.

The upper end of the column mounts a supporting bracket or platform 45 which is provided with suitable bearings supports for rotatably mounting the sheave 43. The platform 45 also mounts a reversible electric motor 46, the spindle of which is provided with a worm 47 that meshes with a worm wheel 48 mounted on a shaft rotatably supported by the platform 45 and also provided with a worm 49 that meshes with a worm wheel 50 fixed on the shaft upon which the sheave 43 is fixed. Consequently operation of the motor 46 will drive the sheave 43 in either one direction or the other to effect vertical raising or lowering of the carriage 39, it being noted that due to the compound worm and worm wheel drive and the locking angles employed therein the carriage 39 will be locked in any position of vertical adjustment.

Before describing the lens mechanism and the automatic focusing control mechanism carried by the carriage 39 the construction of the copy holder 25 and the parts associated therewith will first be described. The copy support 26 comprises a plate that is vertically slidably mounted within the side walls of the copy holder 25, said plate 26 being provided at its sides with guide strips 51 that slide in vertical guideways 52 on the inner side of the side walls of the copy holder 25. The plate or copy support 26 can be raised from its lower position within the copy holder 25 indicated in full lines in Fig. 1 to its raised or operative position indicated by dot and dash lines in Fig. 1 by a mechanism now to be described.

The bottom wall of the copy holder 25 rotatably supports parallel shafts 52 with each of said shafts having fixed thereto a pair of cams 54, with the cams of each pair spaced longitudinally of the shafts and engaging the underside of the plate or copy support 26 at spaced locations, it being understood there will be four cams in engagement with the copy support so as to raise and lower the support vertically but in a horizontally position at all times (see Figs. 1, 2, 16 and 17).

The shafts 53 are operatively interconnected by a shaft 55 extending transversely to the shafts 53 and provided with spaced bevel gears 56 meshing respectively with bevel gears 57 fixed to the shafts 53, wherefore rotation of one of the shafts 53 will impart a corresponding rotation to the other shaft 53 but in the opposite direction. This arrangement provides for simultaneous and equalized swinging movement of the four cams 54, with the cams 54 on one shaft 53 moving in one direction and the cams 54 on the other shaft 53 moving in the opposite direction.

One of the shafts 53 has fixed to it a pinion 58 which meshes with a vertically movable rack 59. The rack 59 is operatively connected to a vertically movable link 60 by means of a horizontal arm 61 that is rigidly secured to the rack 59 and to the link 60, it being understood that said rack 59 and link 60 are suitably guided by guiding surfaces in the copy holder 25.

The lower end of the link 60 is pivotally connected to a foot-operated lever or treadle 62 having at one end a pedal portion 63 while its opposite end is pivotally connected to a supporting block 64 secured to one of the legs or posts 27. It will be seen that by depressing the lever or treadle 62 from the full line position of Figs. 1 and 2 to the dot and dash line positions thereof, the cams 54 will be rocked from the full line position to the dot and dash line position to raise the copy support or plate 26 from its full line position to the dot and dash line position. When the copy plate or support 26 is in its raised dot and dash line position copy mounted on the upper side of the same will be pressed firmly against the underside of a hinged transparent cover plate 65 carried by the copy holder 25.

It will be understood that in the operation of the apparatus the cover plate or lid 65 may be swung upwardly as indicated in Fig. 2 so that the copy can be placed on the support 26 when the latter is in its lowermost or full line position. Then the lid or cover plate is lowered and the operator depresses the treadle 62 to move the copy support or plate 26 to its uppermost position as indicated by dot and dash lines in Fig. 1, at which time the copy will be firmly pressed between the underside of the lid or cover plate 65 and the upper side of the copy support 26, thus pressing out of the copy any wrinkles or irregularities that may be in it so that the copy will present a flat planular surface.

The contour of the cams 54 can be such that when the cams have been rocked to raise the copy holder to its uppermost position the latter will remain therein with very little pressure exerted on the treadle 62, although, of course, as soon as the operator releases the treadle the weight of the copy holder 26 and the copy thereon will cause the cams 54 to rock from their raised position to their lowered position to allow the copy support 26 to move downwardly in the copy holder from the dot and dash line position to the full line position, such movement of the cams acting through the one shaft 53 to move the rack 59 to restore the link 60 and the treadle 62 to the full line position of Fig. 2.

The bottom of the copy holder 25 is extended beyond each side of the copy holder and pivotally supports four upwardly extending standards 66 with said standards being arranged in two pairs so as to pivotally support between the upper ends of the standards of each pair light reflectors 67 that extend from front to rear of the copy holder at the sides thereof. The light reflectors 67 house suitable fittings or sockets for suitable light bulbs, it being understood that suitable electric circuits are provided for energizing such light bulbs. The pairs of standards 66 and the light reflectors 67 carried thereby can be swung inwardly or outwardly relative to the copy holder 25 and can be locked in adjusted swung position by means of locking arms 68 that are pivotally connected to the copy holder 25.

The leg portion 37 of the vertical T-shaped guide carried by the column 36 is provided on one side thereof with a vertically extending fixed rack 69 (see Fig. 3). The fixed rack 69 meshes with a gear 70 fixed on a shaft 71 which is rotatably supported at one end in a bearing extension 72 connected to one of the supporting strips 40. The shaft 71 is also rotatably supported in a bearing bushing 73 mounted in an opening formed in a wall of the carriage 39 and also in an opening in a circular end plate 74, said plate 74 being rotatable about the axis of the bushing 73 and the shaft 71.

The plate 74 has connected to it parallel horizontally extending plates or strips 75 which interconnect the end plate 74 with a second circular end plate 76 that is rotatably guided by a series of circularly spaced rollers 77 supported by a wall portion 78 of the carriage 39.

The circular end plates 74 and 77 and the connecting strips or plates 75 together constitute a rotatable cage that turns on a horizontal axis, i. e., the axis of the shaft 71. The shaft 71 within the turnable cage has fixed to it a bevel gear 79 which meshes with a bevel gear 80 fixed to a shaft 81 that is rotatably supported by the connecting strips 75 of the rotatable cage. The shaft 81 exteriorly of the rotatable cage has fixed to it a gear 82 which extends through an arcuate slot formed in the wall of the carriage 39 to allow for the turning movement of the cage. The gear 82 meshes with a smaller gear 83 fixed on a shaft 84 that is rotatably supported by the connecting strip 75 of the turnable cage.

The shaft 84 within the cage has fixed to it an elongated screw 85 which mounts a nut 86. The nut 86 is provided with a radial extension 87 on its circumference which extends through and slides in an elongated diametrical slot 88 formed in the end plate 86 of the turnable carriage, wherefore said nut 76 is held against turning movement relative to the screw 85 and is free to move axially of the screw in opposite directions (see Figs. 3, 11 and 12).

The radial extension 87 of the nut 86 is provided with a pin 89 that extends beyond the outer surface of the end plate 76 of the turnable cage and engages in an elongated slot 90 formed in a movable rack 91 that is slidably guided in an elongated opening formed in the wall 78 of the carriage 39.

The rack 91 meshes with a pinion 92 fixed on a shaft 93 that is rotatably supported in suitable brackets carried by the wall 78. The shaft 93 also has fixed to it a gear 94 that meshes with an idler gear 95 that is freely rotatable on a stub shaft 96 mounted in the bottom wall portion of the carriage 39.

The idler gear 95 meshes with a gear 97 that is fixed on a nut 98 mounted in an opening formed in the bottom wall of the carriage 39 so as to be free to rotate but held against axial movement. The nut 93 supports a threaded portion 99 of a lens mounting 100. The barrel of the lens mounting 100 has fixed to it an outwardly extending arm 101 which projects into a slot 102 formed in a stop plate 103 secured to the under wall of the carriage 39.

It will thus be seen that the lens mounting 100 is held against rotation by the arm 101 but is free to move axially for adjustment purposes by the rotation of the nut 98.

From the description hereinbefore set forth it will be understood that the vertical movement of the carriage 39 automatically adjusts the lens mounting 100 to vary the focal length of the lens in said mounting. This automatic adjustment is effected through the fixed rack 69 which rotates the gears 70, 79, 80, 82, 83 and the screw 85. The rotation of said screw 85 causes movement of the non-rotatable nut 86 longitudinally of the screw to produce movement of the rack 91 and in turn rotation of the pinion 92, gear 94, idler 95, gear 97 and nut 98. Consequently the focal length of the lens and the lens mounting 100 is automatically adjusted so that the substantially correct focusing relationship of the lens with respect to the copy is automatically produced for every vertically adjusted position of the carriage 39.

The circular end plate 74 of the turnable cage has fixed to it an outwardly and radially extending lever 104 and said lever overlies a segmental stationary lock plate 105 provided on its arcuate outer edge with a series of spaced lock keyways or notches 106. The lever 104 is provided with a slidable trigger or finger grip 107 that rigidly mounts a pin 108 adapted to be engaged selectively in any of the keyways or notches 106. The lever 104 also mounts a spring-pressed plunger 109 which acts to engage the pin 108 in the notches 106 when the operator releases the trigger 107.

It will be seen that the operator by manually retracting the trigger 107 can disengage the pin 108 from the notch 106 and then by the lever 104 can rotate or turn the turnable cage that includes the end plate 74 to any desired position of adjustment within the arc of substantially 90°.

Figure 11:
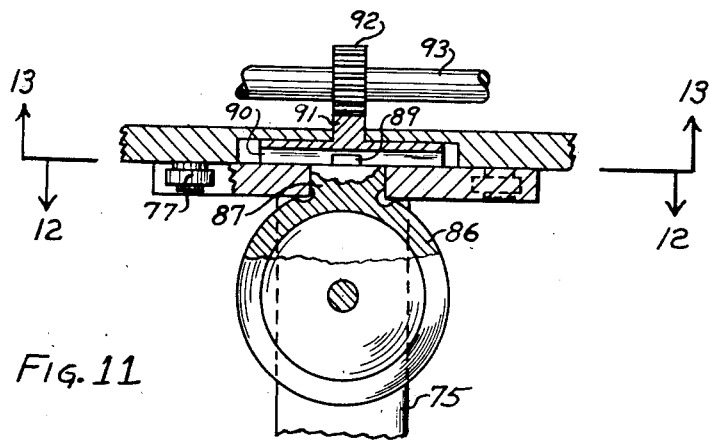
Fig. 11 is a fragmentary sectional view taken substantially on line 11—11 of Fig. 3.
Figure 12:
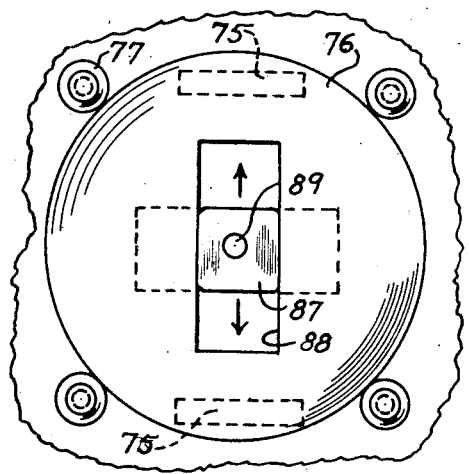
Fig. 12 is a sectional view taken along line 12—12 of Fig. 11 looking in the direction of the arrows.

In Figs. 3 and 11 the turnable cage is shown as adjusted to the position wherein the shaft 84 that carries the screw 85 is parallel to and extends in the same direction as the path of movement of the rack 91 and hence the nut 87 imparts a one-to-one or maximum movement to the rack 91. This condition is illustrated in Fig. 13 by the full line position of the pin 89 in the groove 90 on the underside of the rack and said pin will travel between the full line position and dash line positions 89a and 89b, thus moving the rack lengthwise of the guiding opening in the wall 78.

Figure 13:
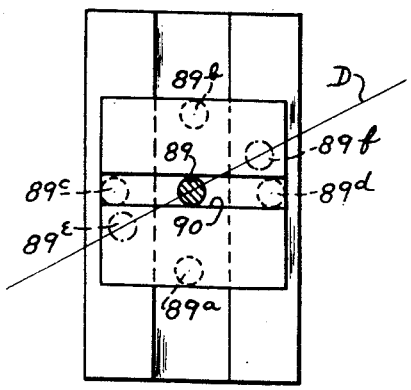
Fig. 13 is a sectional view taken along line 13—13 of Fig. 11 looking in the direction of the arrows.

When the turnable cage is adjusted 90° from the position of Figs. 3 and 11 the axis of the screw 85 is perpendicular to the path of movement of the rack 91 and the nut imparts no movement to the rack since the pin 89 simply travels lengthwise of the slot 90 in the underside of the rack this being indicated by the full line illustration of the pin 89 in the slot 90 and the dash line positions 89c and 89d of said pin in Fig. 13.

When the turnable cage is adjusted to a position intermediate the two positions just above referred to then the axis of the screw 85 is disposed at an angle other than perpendicular to the path of movement of the rack and the movement of the nut 86 on the screw 85 imparts a reduced amplitude of movement to the rack than the maximum movement first referred to and in direct proportion to the angular position of the axis of the screw.

Figure 4:
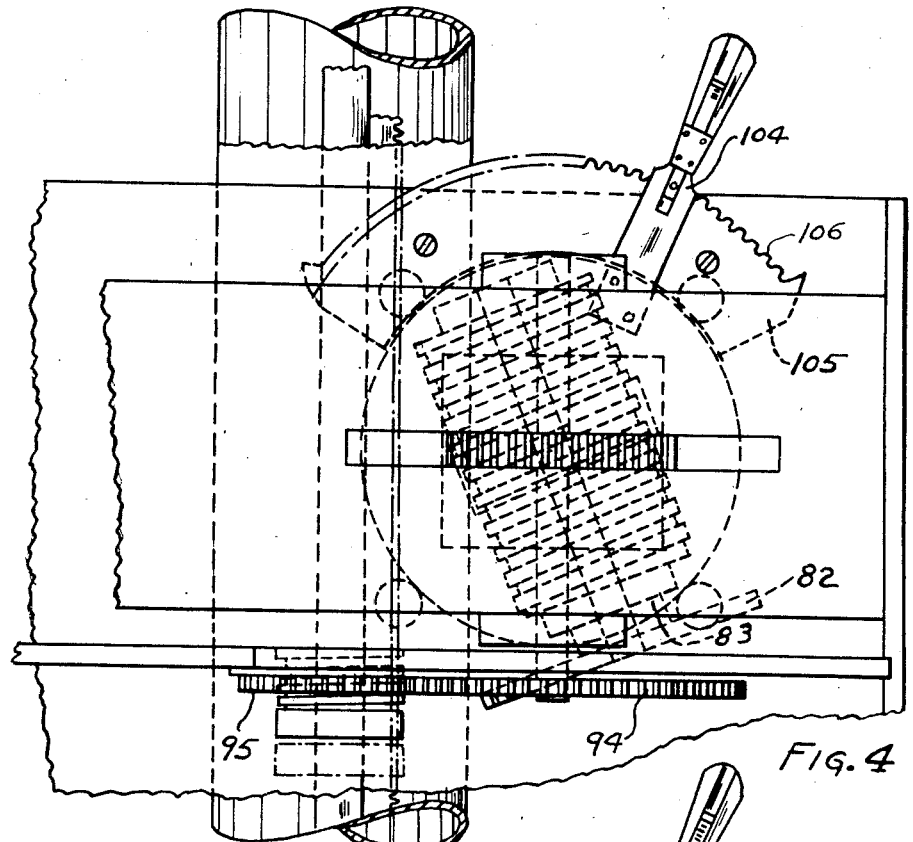
Fig. 4 is a sectional view taken on line 4—4 of Fig. 3 looking in the direction of the arrows with certain of the parts displaced from the position they occupy in Fig. 3.
Figure 5:
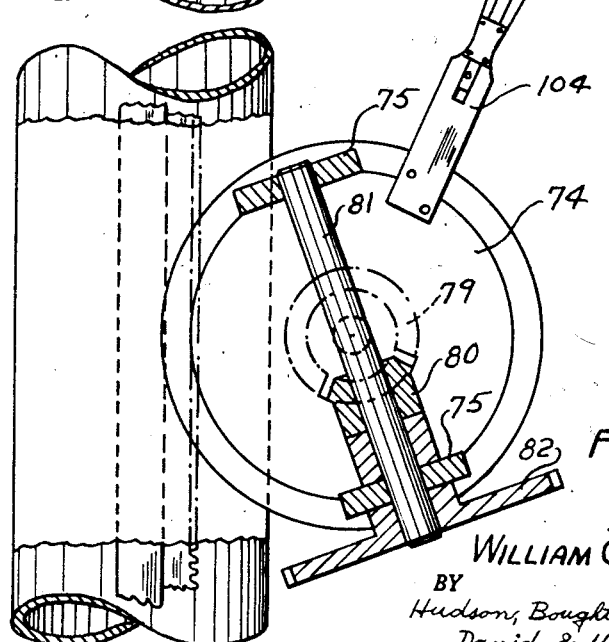
Fig. 5 is a sectional view taken along line 5—5 of Fig. 3 looking in the direction of the arrows.

The last mentioned condition is illustrated in Figs. 4 and 13 and it will be noted by reference to Fig. 13 that the pin 89 moves between its full line position to dash line positions 89e and 89f along line D representing the axis of the screw 85. It is apparent that when the axis of the screw is in any angularly adjusted position intermediate at 90° position and its parallel position with respect to the path of movement of the rack that then the nut imparts a reduced movement to the rack. The arrangement just referred to is for the purpose of imparting a modified adjustment of the lens mounting over the normal automatic adjustment thereof when the axis of the screw 85 is parallel to the path of movement of the rack. In other words, the rotating adjustment of the turnable cage enables a modified automatic adjustment to be imparted to the lens mounting by the vertical movement of the carriage 39. Thus there is provided a means within the control of the operator to procure the optimum adjustment of the lens mounting as found to be necessary by him.

The unit which carries a flat sheet of sensitized film or plate and which is supported on the upper side of the extended portion of the carriage 39 that carries the lens mounting 100 will now be described. This unit comprises a compound slide arrangement and the film sheet or sensitized plate is carried by the uppermost of the compound slides and is in rectangular form. It will be understood that the unit can be accurately secured in position by any suitable means.

The unit comprises a base 110 which is secured to the carriage 39 and has at each of its ends at its upper surface a track 111 that extends transversely of the base. A lower slide 112 is provided with four rollers 113 that roll in the tracks 111, wherefore said lower slide 112 can be moved transversely of the base 110 for adjustment purposes between the dash line positions of the rollers 113 indicated at 113a and 113b in Fig. 9.

The base 110 at its end is provided with an extension 114 and said extension is provided with a straight line series of predeterminedly spaced openings 115, five such openings being indicated in Fig. 9. The lower slide 112 at its end is provided with a projecting portion 116 which overlies the extension 114 of the base and said projecting portion 116 pivotally supports a lever 117 that carries a depending pin or detent that can be selectively engaged in any one of the openings 115 to lock the lower slide in adjusted position on the base.

The projection 116 carries a leaf spring 118 bearing on the lever 117 and acting to maintain the pin or detent carried by the lever engaged in the opening. Of course when the lever 117 is raised against the action of the spring 118 the pin or detent carried by the lever is disengaged from a particular opening 115 and then the lower slide can be moved by said lever transversely of the base to the desired position and the pin or detent engaged with the proper opening to lock the slide in adjusted position.

The lower slide 112 on its upper surface is provided adjacent its longitudinal edges with parallel longitudinally extending tracks 119. An upper slide 120 carries four rollers 121 which roll in the tracks 119 of the lower slide and hence the upper slide 120 can be moved or adjusted longitudinally of the lower slide from its full line position of Fig. 9 to its dot and dash line position. The lower slide 112 midway of one of its longitudinal edges is provided with an extension 122 which is provided with a straight line series of openings 123 there being fifteen openings 123 illustrated herein.

The upper slide 120 is provided with a projecting portion 124 that overlies the extension 122 on the lower slide and said projecting portion 124 pivotally supports a lever carrying a pin or detent for engaging in the openings 123 and identical with the lever 117 carried by the lower slide and previously described and consequently the lever carried by the upper slide will be identified herein as 117a and the spring as 118a.

It will be understood that the pin or detent carried by the lever 117a can be selectively engaged in any of the openings 123 and will be held in such engagement by the spring 118a. Also it will be understood that the lever 117a can be raised by the operator to disengage the pin or detent from a particular opening 123 and then the operator by means of the lever 117a can shift the upper slide longitudinally of the lower slide to any desired position and upon releasing the lever its pin or detent will engage in the new opening 123 to hold the upper slide in adjusted position.

The upper slide 120 is provided with a rectangular opening 125 which overlies a larger rectangular opening in the lower slide 112. The upper slide 120 is provided with positioning lugs or abutments 126 which enable the rectangular flat film sheet or sensitized plate 127 to be located and properly supported on the upper side of the upper slide so as to overlie the opening 125. It will be noted that the upper and lower slides each has adjusting movement that is perpendicular to the adjusting movement of the other.

It will be understood that the lens mounting 100 is located in line with the opening 125. It will further be understood that different fractional area portions of the sheet film or plate 127 can be centralized with respect to the focal axis of the lens by adjustably shifting the lower slide 112 and the upper slide 120. Inasmuch as the lower slide has five different positions of adjustment and the upper slide fifteen different positions of adjustment the film or plate can be so adjusted as to bring seventy-five different area portions in line with the focal axis of the lens and these area portions will be arranged in five rows of fifteen area portions in each row. In order that only each area portion of the film or plate will be exposed in any one instance a suitable mask is provided for the lens mounting 100.

Figure 18:
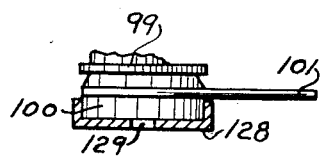
Fig. 18 is a detailed view of the lens mounting showing in section a cup-shaped mask mounted on the lens.
Figure 19:
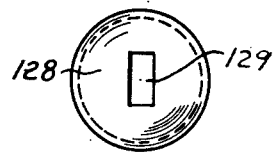
Fig. 19 is an end view of the mask shown in Fig. 18.

As shown in Figs. 18 and 19, a cup-shaped mask 128 is mounted on the lens mounting 100 and frictionally holds itself thereon. The mask 128 is provided with an opening 129 centered on the focal axis of the lens and oriented to the copy and of such size that only one area portion of the film or plate will be exposed at a time.

The carriage 39 is provided with a bracket 130 which pivotally supports a light housing 131 that can be swung downwardly from the dot and dash line position of Fig. 2 into the full line position so as to overlie the compound slide on the carriage and a film or plate mounted on said slide. The light 131 is used when it is desired to reproduce from a developed microfilm positives thereof and in such case the developed microfilm is positioned on the carriage 39 and the sensitized plate or film for the positive is positioned in the copy holder 25 as will be more fully brought out hereinafter.

It will first be assumed that individual book pages are to be microphotographed in multiple row series. The operator raises or lowers the carriage 39 to the proper position to obtain accurate focusing of the lens with respect to the copy, it being recalled that this focusing of the lens is automatic and can be modified for finer adjustment by moving the lever 104 and turning the turnable cage to the proper position for the correct angular adjustment of the screw 85.

The operator adjusts the compound slide in which the flat sheet film or plate is mounted to the proper position to have the first area portion thereof centered on the focal axis of the lens. Preferably a hood indicated in Fig. 2 by dot and dash lines will be positioned on the carriage 39 to exclude light from the film or plate. The operator raises the transparent lid or cover 65 of the copy holder 25 and places the book with the first page thereof that is to be microphotographed in proper position on the copy support 26. He then closes the transparent cover plate, depresses the treadle 62 to raise the copy support to its uppermost position with the first page of the book pressed against the underside of the transparent cover plate 65.

It will be understood that the lens mounting preferably is provided with a shutter which the operator will then actuate to expose the first area portion of the sheet film or plate and microphotograph thereon the first page of the book. It will also be understood that the lights in the reflectors 67 are turned on, although said lights may be articulated with the shutter of the lens mounting so as to only be illuminated when the shutter is open. The procedure just outlined is repeated for each page of the book that is to be microphotographed, it being understood that the compound slide on the carriage 39 is adjusted each time to bring the next area portion in each row series into centralized location with the focal axis and of course after microphotographs have been made of all of the area portions in each row series the compound slide is adjusted to position the first area portion of the next row series. It will also be understood that the mask 128 is properly positioned on the lens mounting so only one area portion of the film or plate will be exposed each time the shutter is opened.

In the particular arrangement illustrated and described seventy-five individual book pages can be successively microphotographed on the sheet film or plate with the individual pages arranged in series in multiple rows.

In case the copy consists of multiple cards arranged in multiple row series as distinguished from individual book pages the copy is positioned in the copy holder on a compound slide arrangement similar to the compound slide arrangement on the carriage 39. In this mode of operation both the copy and the sheet film or plate will be successively shifted or adjusted to center each card copy and each corresponding area portion of the film or plate in the focal axis of the lens so that each card can be microphotographed on a correlated area portion of the sheet film or plate.

The apparatus can also be used to reproduce from the developed microfilm record positive reproductions thereof. In this form of operation a sensitized plate or sheet would be mounted in the copy holder while the developed flat sheet microfilm or plate would be mounted in the carriage 39. Then the developed microphotograph which is to be reproduced would be positioned in the focal axis of the lens by shifting the compound slide carried by the carriage 39, after which the pivoted light source 131 above the lens would be swung into position and light passed through the developed microphotograph and the lens and onto the sensitized sheet in the copy holder to positively reproduce the microfilm record.

In this mode of operation if a full book page is to be positively reproduced the procedure would be the reverse of the procedure outlined above for microphotographing successively the full pages of a book. If microphotographs of a multiplicity of cards arranged in a multiple row series are to be individually positively reproduced in multiple row series on the sensitized sheet in the copy holder then the operation would be the reverse of that outlined above for the production of the microphotographs of the cards and a compound slide would be used in the copy holder as well as in the carriage 39.

From the foregoing description it will be seen that the method and apparatus embodying the invention adequately provide for accomplishing the objects hereinbefore enumerated and enable microphotographs of whole book pages or of separate record cards to be successively made in multiple row series on a flat sheet film or plate so as to be readily identified and accessible when it is desired to read a particular microphotograph.

Also it will have become apparent that the method is an expeditious one and that the apparatus functions efficiently, accurately and quickly and can be readily operated by an ordinary skilled operator.

Although a preferred embodiment of the invention has been illustrated and described herein it will be understood that the invention is susceptible of various modifications and adaptations within the scope of the appended claims.

Having thus described my invention, I claim:

1. In a microfilm camera, means for holding the copy in a plane, a supporting member, a carriage parallel to said plane and containing a lens mounting the focal axis of which is centrally perpendicular to said plane; means connecting said lens mounting with said carriage for adjustment relative thereto and including a rotatable nut, a gear connected to said nut and rotatable therewith and an externally threaded lens barrel screwed in said nut, and means for holding said barrel against rotation but permitting endwise movement thereof; cooperating means on said supporting member and said carriage for supporting the latter for adjustment toward and away from said plane; means automatically associated with said means connecting said lens mounting with said carriage for automatically adjusting the focal length of the lens mounting in correlation to the adjusting movement of the carriage toward and away from the copy plane and including a rack carried by said supporting member and extending longitudinally thereof, motion transmitting means carried by said carriage and including a gear meshing with said rack and a gear meshing with the gear on said nut of the lens mounting; said carriage being provided with mechanism for holding a flat sheet film or sensitized plate in parallelism to said plane and for shifting said film or plate in either of two directions to centralize predetermined uniform fractional portions thereof with respect to the focal axis of the lens mounting whereby a multiplicity of separate microphotographs arranged in multiple row series can be produced on said film or sheet with each microphotograph being of a separate copy in the copy holder.

2. In a microfilm camera as defined in claim 1 and wherein the means for automatically adjusting the focal length of the lens mounting in relation to adjusting movement of the carriage includes manually settable means for varying within predetermined limits the normal automatic adjustment imparted to said lens mounting in response to adjusting movement of the carriage, said manually settable means including a rockable cage carried by said carriage and having therein a rotatable screw mounting a nut and operatively connected with a rack carried by said carriage for linear movement whereby rocking adjustment of said carriage varies the amplitude of linear movement imparted to said rack by said nut mounted on said screw.

References Cited in the file of this patent

UNITED STATES PATENTS

| | | |
|---|---|---|
| 773,627 | Boston | Nov. 1, 1904 |
| 1,045,539 | Folmer | Nov. 26, 1912 |
| 1,393,793 | Kryzanowsky | Oct. 18, 1921 |
| 1,623,538 | Hopkins | Apr. 5, 1927 |
| 1,888,054 | Tipecska | Nov. 15, 1932 |
| 1,986,693 | Uher | Jan. 1, 1935 |
| 2,123,510 | Leitz | July 12, 1938 |
| 2,137,028 | Rau | Nov. 15, 1938 |
| 2,158,039 | Wencler | May 9, 1939 |
| 2,275,519 | Friedericks | Mar. 10, 1942 |
| 2,348,457 | Drehs | May 9, 1944 |
| 2,369,981 | Reyniers | Feb. 20, 1945 |
| 2,377,514 | Pickett | June 15, 1945 |